INVENTOR.
John R. Wilson

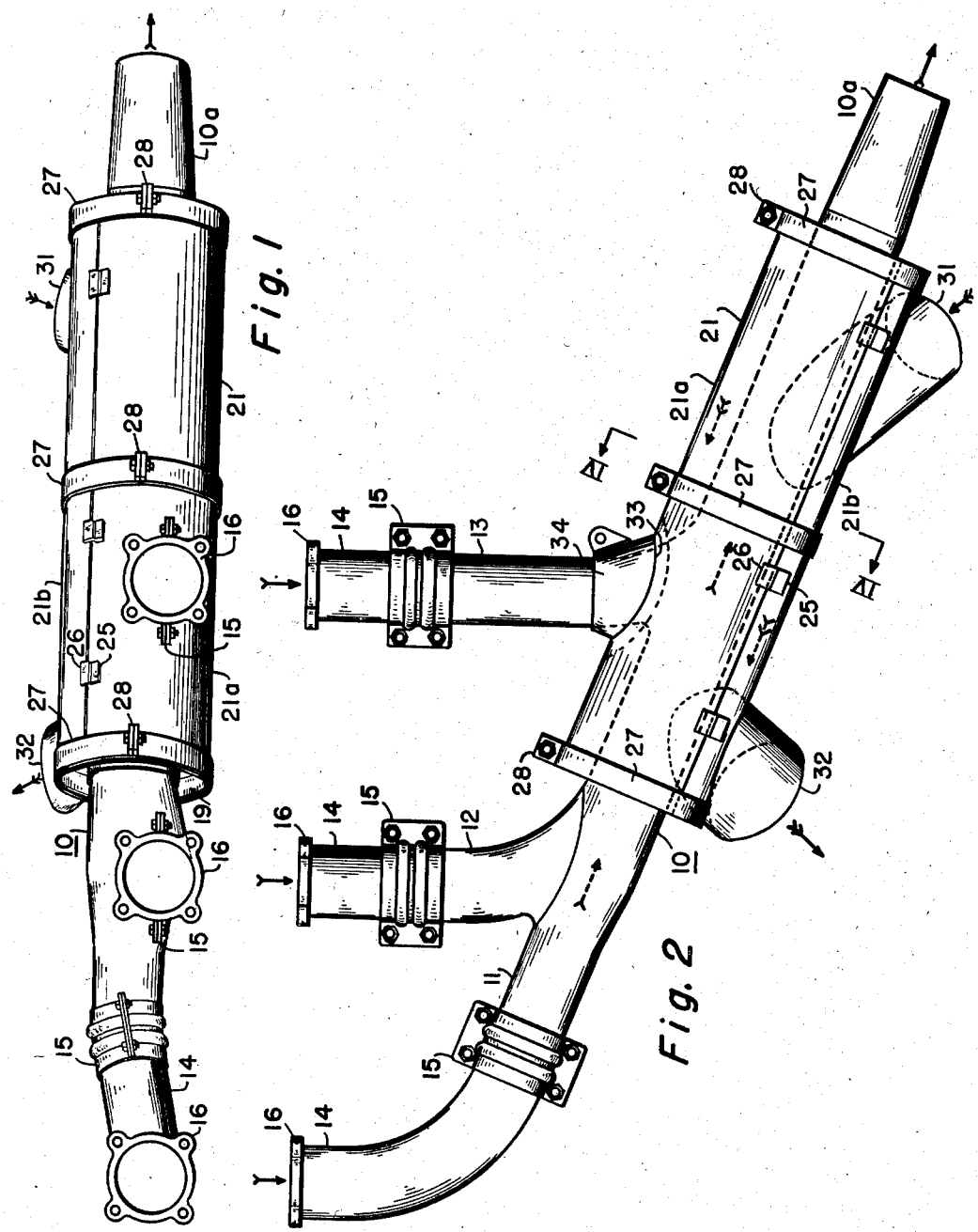

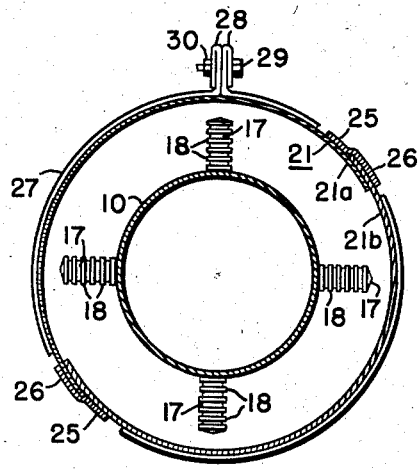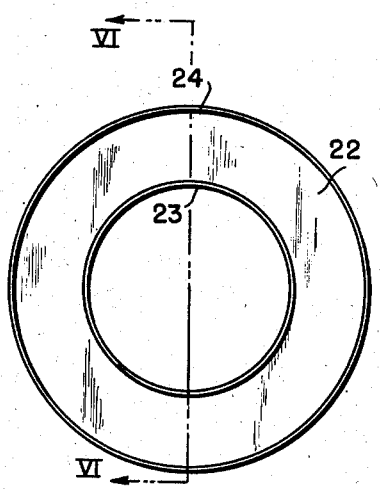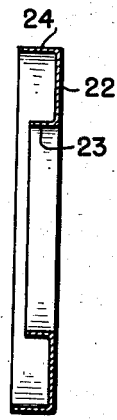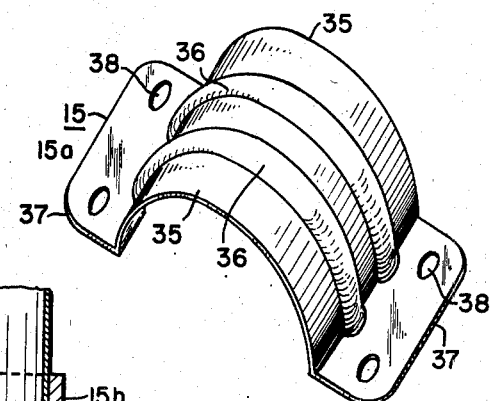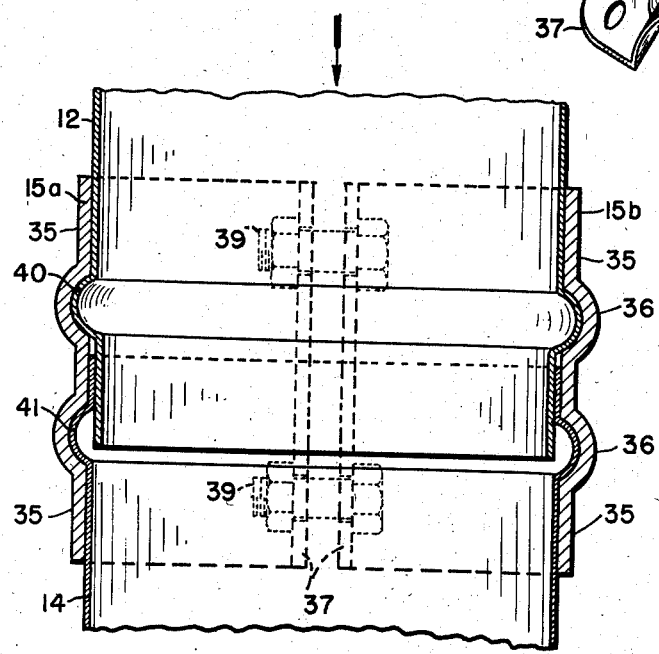

United States Patent Office 2,801,828
Patented Aug. 6, 1957

2,801,828

HEAT EXCHANGER, ESPECIALLY FOR AIRPLANES

John R. Wilson, Penn Township, Allegheny County, Pa., assignor to Hanlon & Wilson Company, Pittsburgh, Pa.

Application November 8, 1954, Serial No. 467,618

4 Claims. (Cl. 257—16)

This invention relates to a heat exchanger and, more particularly, to a combination manifold and muffler type heater especially adapted for expansible connection into the exhaust system of an airplane engine.

It is a very common practice in constructing heat exchangers to place a number of tubes or the like directly inside a large duct, boiler, or similar enclosure so that a hot fluid such as gas flowing through the duct or present in the boiler gives up some of its heat to a cooler fluid flowing through the tubes. Many variations of this standard construction are known but, to my knowledge, some part or substantially all of the apparatus designed to absorb heat is stationed directly within the larger duct or other enclosure containing the heat-providing gas.

It has also been proposed to use a somewhat similar structure for airplanes. In my prior patent, No. 2,600,595, which issued June 17, 1952, I have, for example, disclosed and claimed a heat exchanger in which a tubular core has a concentric inner tube and a concentric outer shroud, the latter being spaced from the core by pins which are welded to the core and slidably support the shroud. The tubular core receives hot gases such as the exhaust from an airplane engine, and the inner tube and outer shroud jointly receive another gas to be heated.

While this heat exchanger is very satisfactory for its intended purpose, obstructions to the flow of exhaust gases through a main duct or manifold can be objectionable. Where speed is important, for instance, it has been noted that by providing an unobstructed flow of gases to and through the tail pipe of the airplane, an increase in speed can be obtained by reason of the thrust created by the exhaust through the tail pipe. Naturally, in providing an unobstructed flow through a manifold there is ordinarily a greatly reduced area of contact between the relatively hot and relatively cold gases, so that the efficiency of the heat exchanger is seriously lowered. Also, the total area of actual contact between a manifold and an enclosing shroud, for example, becomes a more serious problem because such areas provide avenues of heat conductance which heat the outside of the shroud where it is much more quickly cooled by surface radiation rather than heating the relatively cool gas between the shroud and the manifold.

I have now developed a heat exchanger in which the manifold is entirely free of any internal obstructions throughout its length and yet which provides a very satisfactory heat exchange efficiency. In one form, I use a manifold completely free of obstructions, as stated, and rely for heat transfer on a number of pins which project from the outer surface of the manifold. At least the length of the manifold containing the pins is enclosed by a shroud which has a minimum area of direct contact with the manifold thereby to reduce heat loss resulting from conductance to the surface of the shroud followed by radiation. In the preferred form, I use a sealing ring at each end of the shroud to space the shroud not only from the manifold but also the heat-radiating pins. The rings have a relatively thin portion connecting the manifold and shroud further to reduce heat loss through conductance. In addition, the rings act to seal the shroud about the manifold and prevent leakage.

In my preferred embodiment, I also employ improved means for providing an expansible connection between the manifold and a duct or conduit extending, for example, from an engine exhaust port. In one form, the manifold and conduit have telescoping ends and peripheral beads. A clamp comprising two sections encloses the telescoping ends. Each section has an arcuate portion with recesses on its concave side adapted to receive the peripheral beads of the manifold and conduit. The sections are suitably secured together.

The accompanying drawings illustrate a presently preferred embodiment wherein:

Figures 1 and 2 are plan and side eleavtions, respectively, of my heat exchanger;

Figures 3A and 3B when taken together constitute a longitudinal section of Figure 2 with the shroud removed to show the heat-radiating pins and sealing rings;

Figure 4 is a section of Figure 2 on the line IV—IV with parts of an outer band broken away to illustrate clips which join sections of the shroud;

Figure 5 is an enlarged end view of a sealing ring;

Figure 6 is a section of Figure 5 on the line VI—VI;

Figure 7 is a perspective view of one of the sections of the clamp which provides the expansible connection for my heat exchanger to the exhaust system of the airplane engine; and Figure 8 is a section of Figure 3A on the line VIII—VIII illustrating how the clamp connects the ends of two telescoping ducts.

Figure 3A:
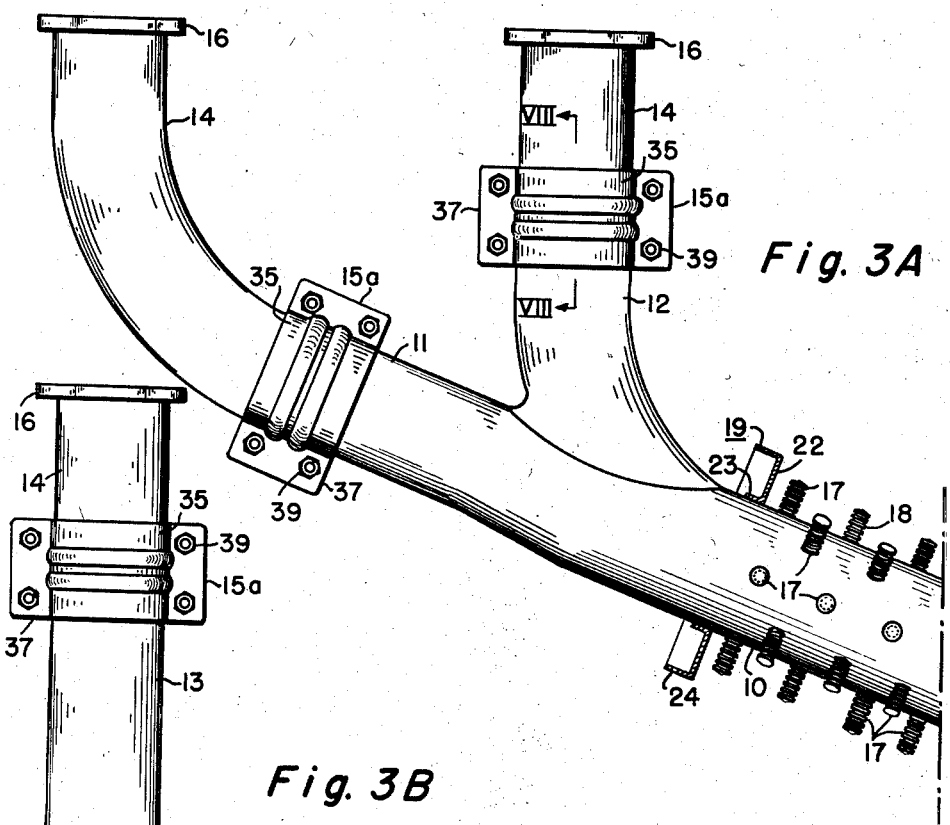
Figure 3B:
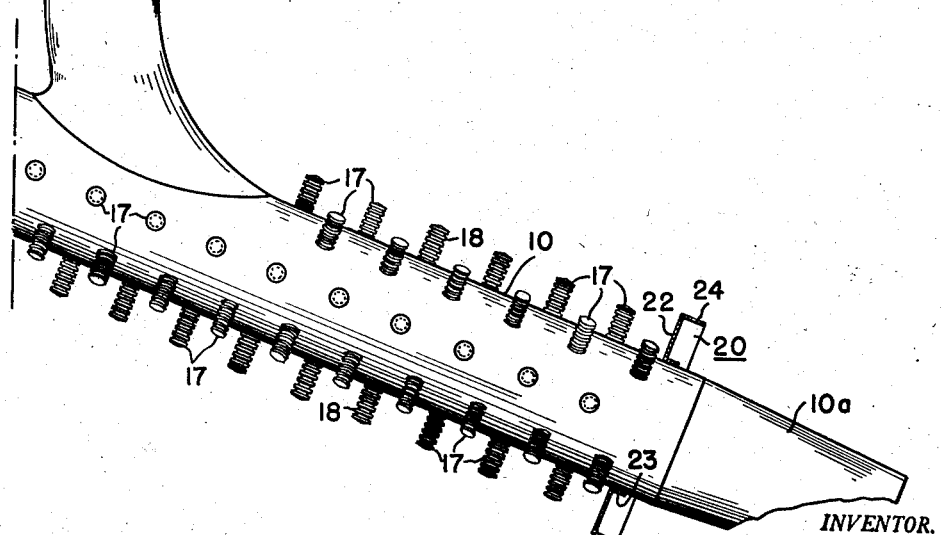

Referring to the drawings, my heat exchanger includes a manifold generally shown at 10 having several inlet ducts 11, 12, and 13. These ducts are connected to other ducts or conduits 14 by an expansible clamp 15. The conduits 14, in turn, may be connected to the exhaust ports of an airplane engine by flanges 16. The end 10a of the manifold may be joined to the tail pipe of the airplane. The manifold has a plurality of heat-radiating pins 17 projecting from its outer surface. The pins are welded to the manifold and may be stationed in any number and in any selected pattern around the periphery of the manifold. Preferably, the pins have fins 18 to aid the transfer of heat.

Rings 19 and 20 are fixed to the manifold to space a shroud 21 from the manifold and from the pins 17 as well. In this regard, the pins 17 should not be confused with the use of pins in my cited Patent No. 2,600,595. The latter were used to support a shroud about a core and for this purpose made solid contact between the core and shroud. Each of the rings 19 and 20 includes an annulus 22 having flanges 23 and 24 axially disposed in the same direction. The rings 19 and 20 may be made in two sections and welded together in position about the manifold. Flange 23 is also welded to the manifold 10, and flange 24 provides a seat for the shroud 21.

As shown in Figure 4, the shroud 21 may also be made in two longitudinal sections 21a and 21b which overlap at their adjacent ends. Clips 25 join the overlapping edges. Each clip is welded adjacent one end to the underlying shroud section and has an offset end 26 to receive an edge of the overlying section. Bands 27 transversely encircle the sections 21a and 21b preferably directly over each of the ring flanges 24. The bands 27 have upstanding lugs 28 at their adjacent ends which are normally spaced somewhat apart. Bolts 29 and nuts 30 join the ends together so that the bands 27 tightly hold the shroud sections 21a and 21b in assembly over the sealing rings 19 and 20. As indicated in Figure 2, a band may also be used around the center of the shroud. The shroud has an inlet duct 31 and an outlet duct 32 and may have other suitable openings to receive, for example, the duct 13 through an opening 33 having a skirted enclosure 34 which together with the neck of the duct 13 forms an interposed chamber freely communicating with the interior of the shroud 21 and sealed to the outside so as to prevent the entry of stray gases.

It is emphasized that only two rings 19 and 20 are used to space the shroud 21 from the manifold 10, and these rings constitute the only direct connection between the manifold and shroud. Accordingly, heat conductance between the manifold and shroud is reduced to a minimum. Additionally, while flange 23 makes an areal contact with the manifold 10 and thereby provides a substantially rigid connection and while flange 24 similarly makes areal contact with the shroud 21, only the relatively thin strip of the annulus 22 is capable of conducting heat to the shroud. The relative thinness of this strip further minimizes losses through heat conductance. Moreover, the rings 19 and 20 act to seal the end of the shroud to the manifold and prevent leakage.

The ducts 11, 12, 13 and conduits 14 are connected by expansible clamps 15. Each clamp includes two mating sections 15a and 15b and, as shown in Figure 7, each section comprises an arcuate portion 35 having recesses 36 on its concave side. The recesses of each section are aligned with each other. Plates 37 extend from the portion 35 and have bolt holes 38 for bolts 39 which conventionally connect the corresponding plates of the two sections. As illustrated in Figure 8, the duct 12 and conduit 14 have telescoping ends and circumferentially-extending beads 40 and 41, respectively, adjacent the ends. The recesses 36 receive the beads 40 and 41 and for this purpose these parts have conforming shapes. By this clamping means, the duct 12 and conduit 14 can expand and contract appreciably under the influence of the exhaust gases without affecting the clamping action.

In practice, the hot exhaust gases enter the conduits 14 and ducts 11, 12, and 13 to flow through the unobstructed manifold 10 and then out the tail pipe of the plane, as indicated by the single-tailed arrows in Figure 2. By reason of this even and uninterrupted flow, a forward thrust is supplied to the plane. In the meantime, air or other gas enters the inlet 31 of the shroud, flows around the outer surface of the manifold and particularly about the pins 17, and then exits through the outlet 32, as indicated by the double-tailed arrows. The air, now at an appreciably higher temperature, may then be used for heating the cabin of the plane or directed along the wings of the plane for anti-icing purposes or employed for still other uses. Heat conductance through the relatively thin annuli 22 is relatively small, thereby adding to the overall efficiency of the heat exchanger.

It is understood that the position of the shroud 21 on the manifold 10 is not critical. The shroud may, for example, be moved farther along the manifold toward the engine exhaust ports so as to receive as well duct 12 through the shroud in the manner illustrated for duct 13.

While the foregoing disclosure describes a presently preferred embodiment, it is understood that the invention may be practiced in other forms within the scope of the following claims.

I claim:

1. A combined muffler and heater type device for exhaust manifold structure comprising in combination, a substantially straight manifold body portion having an unobstructed interior for the generally free flow of heated exhaust gas therethrough, a plurality of transverse branch inlet portions disposed along the longitudinal extent of said straight body portion of the exhaust manifold structure and joined thereto at spaced points, sealing rings secured to said straight body portion transversely thereto and between the ends thereof, a shroud covering the sealing rings so as to be sealed at the ends thereby and formed with at least one side opening through which one of said transverse branch inlet portions passes in spaced relationship, a skirt carried between and forming a gas-tight joint with the neck of the aforesaid branch portion and the aforesaid side opening and enclosing the latter, pluralities of pins disposed one on each side of said branch portion and affixed to the exterior of said body portion within the space surrounded by said shroud, said pins having separated transverse fins for utilizing the heat of the manifold to heat longitudinally moving air, and an air intake and outlet communicating with the interior of the shroud and joined thereto in an angular disposition for passing air over the pins for the absorption of heat and then passing in heated state through the outlet.

2. The combination according to claim 1 wherein one of said sealing rings is disposed between the branch inlet portion aforesaid and an adjacent branch inlet portion and wherein said shroud comprises mating semi-cylindrical halves and clamping bands clamping the halves to one another and to the sealing rings at their ends.

3. The combination according to claim 2 wherein said rings each have axially disposed flanges making a wide area of contact with the shroud and with the manifold body portion and together effective to hold the halves of the shroud spaced from the manifold structure and from the ends of the pins, and wherein said pins are permanently welded to the exterior of the manifold body portion and the fins thereon are of an annular construction.

4. The combination according to claim 1 wherein said skirt is arranged in a manner in which it protrudes outwardly from the side opening in said shroud and which together with the neck of said branch inlet portion defines an interposed chamber freely communicating with the interior of the shroud and sealed to the outside so as to prevent the entry of stray gases.

References Cited in the file of this patent

UNITED STATES PATENTS

| | | |
|---|---|---|
| 671,768 | Knox | Apr. 9, 1901 |
| 823,591 | Eager | June 19, 1906 |
| 1,758,214 | Blake | May 13, 1930 |
| 1,883,452 | Armstrong | Oct. 18, 1932 |
| 1,986,405 | Mears | Jan. 1, 1935 |
| 2,004,252 | Sorenson | June 11, 1935 |
| 2,059,992 | Gould | Nov. 3, 1936 |
| 2,080,988 | Schulz | May 18, 1937 |
| 2,240,311 | Mills | Apr. 29, 1941 |
| 2,428,066 | Ellis | Sept. 30, 1947 |
| 2,474,431 | Lipman et al. | June 28, 1949 |
| 2,600,595 | Wilson | June 17, 1952 |